(12) United States Patent
Chauvel et al.

(10) Patent No.: US 7,197,623 B1
(45) Date of Patent: Mar. 27, 2007

(54) MULTIPLE PROCESSOR CELLULAR RADIO

(75) Inventors: Gerard Chauvel, Antibes (FR);
Francis Aussedat, Nanterre (FR);
Pierre Calippe, Cagnes-sur-Mer (FR)

(73) Assignee: Texas Instruments Incorporated,
Dallas, TX (US)

( * ) Notice: Subject to any disclaimer, the term of this patent is extended or adjusted under 35 U.S.C. 154(b) by 1222 days.

(21) Appl. No.: 09/606,057

(22) Filed: Jun. 28, 2000

Related U.S. Application Data

(60) Division of application No. 08/890,894, filed on Jul. 10, 1997, now Pat. No. 7,028,145, which is a continuation of application No. 07/902,191, filed on Jun. 22, 1992, now Pat. No. 5,740,458.

(30) Foreign Application Priority Data

Jun. 27, 1991 (FR) .................................. 91 07985

(51) Int. Cl.
*G06F 15/76* (2006.01)
*H04Q 7/20* (2006.01)

(52) U.S. Cl. ...................... 712/2; 712/10; 455/422.1
(58) Field of Classification Search ............... 455/575, 455/422, 403, 436, 442, 550, 556, 557, 563, 455/569, 90; 712/2, 10, 11, 16–17, 35
See application file for complete search history.

(56) References Cited

U.S. PATENT DOCUMENTS

| 4,829,554 A | * | 5/1989 | Barnes et al. ................. 379/58 |
|---|---|---|---|
| 4,964,035 A | | 10/1990 | Aoyama et al. ................ 712/3 |
| 5,045,993 A | | 9/1991 | Murakami et al. ........... 364/200 |
| 5,155,843 A | | 10/1992 | Stamm et al. ......... 395/182.03 |
| 5,179,530 A | | 1/1993 | Genusov et al. ............ 364/726 |
| 5,187,796 A | | 2/1993 | Wang et al. ................ 395/800 |
| 5,237,686 A | | 8/1993 | Asano et al. ................ 395/650 |
| 5,241,690 A | * | 8/1993 | Larsson et al. ............. 455/522 |
| 5,740,458 A | | 4/1998 | Chauvel et al. ............... 712/34 |
| 6,000,026 A | | 12/1999 | Chauvel et al. ............... 712/34 |
| 6,282,180 B1 | * | 8/2001 | Paneth et al. ............... 370/330 |

FOREIGN PATENT DOCUMENTS

| EP | 0 157 306 B1 | 10/1985 |
|---|---|---|
| EP | 0 334 627 A3 | 9/1989 |

OTHER PUBLICATIONS

Claesson, A Multi-DSP Implementation of a Broad-Band Adaptive Beamformer for use in a Hands-Free Mobile Radio Telephone, Feb. 1991, IEEE, 194-202.*
Mano, Computer System Architecture, Prentice-Hall Inc., pp. 282-284, 1982.*

* cited by examiner

*Primary Examiner*—Denise Tran
(74) *Attorney, Agent, or Firm*—Ronald O. Neerings; Wade James Brady, III; Frederick J. Telecky, Jr.

(57) ABSTRACT

Protocol processor intended to be associated with at least one main processor of a system with a view to the execution of tasks to which the main processor is not suited. The Protocol Processor comprises a program part (30) including an incrementation register (31), a program memory (33) connected to the incrementation register (31) in order to receive addresses thereof, a decoding part (35) intended to receive instructions from the program memory (33) of the program part (30) with a view to executing an instruction in two cycles, and a data part (36) for executing the instruction.

13 Claims, 9 Drawing Sheets

FIG. 3

PERFORMANCE OF CHANNEL CODEC ROUTINES

| ROUTINES | DSP UTILIZATION C5x | PROC PROTOCOL PP UTILIZATION |
|---|---|---|
| 16 BIT CRC | 6 INSTR/BIT | 4 INSTR/BIT |
| IDENTIFICATION | 5 INSTR/BIT | 1 INSTR/BIT |

| RATIO | | |
|---|---|---|
| SEL/INSTR EFFICIENCY | x1 | x2.2 |
| NO. OF TRANS | 58 KTx | 6.5 KTx |
| MIPS | 28 MIPS | 28x2.2=62 MIPS DSP |

FIG. 4

PERFORMANCE OF MODEM ROUTINES

| ROUTINES | DSP UTILIZATION C5x | ARRAY PROC |
|---|---|---|
| METRIC COMPUTATION 57 SYMBOLS (4 SAMPLES) | 43800 CYCLES | 4400 CYCLES |

| RATIO | | |
|---|---|---|
| INSTRUCTION SETTING EFFICIENCY | x1 | x10 |
| MIPS | 28 MIPS | 28x10=280 MIPS DSP |

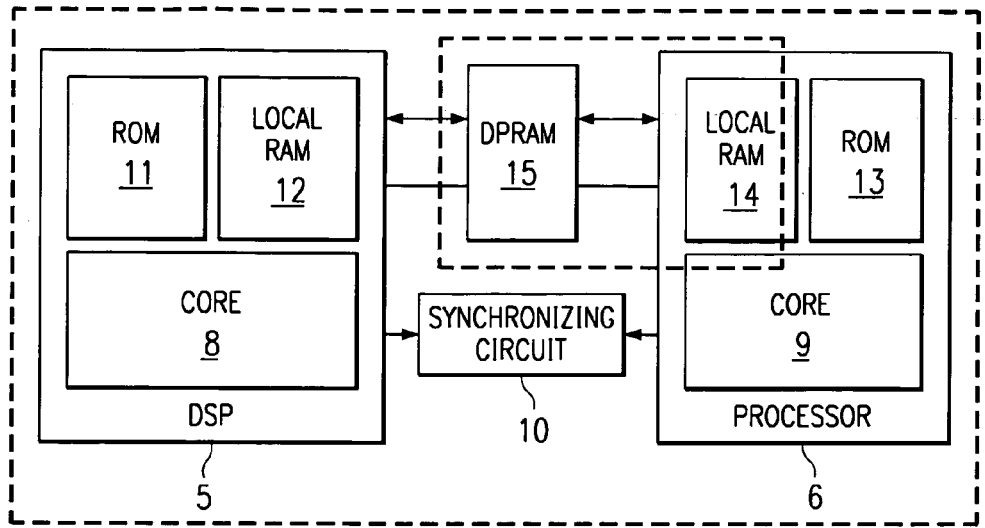
FIG. 5
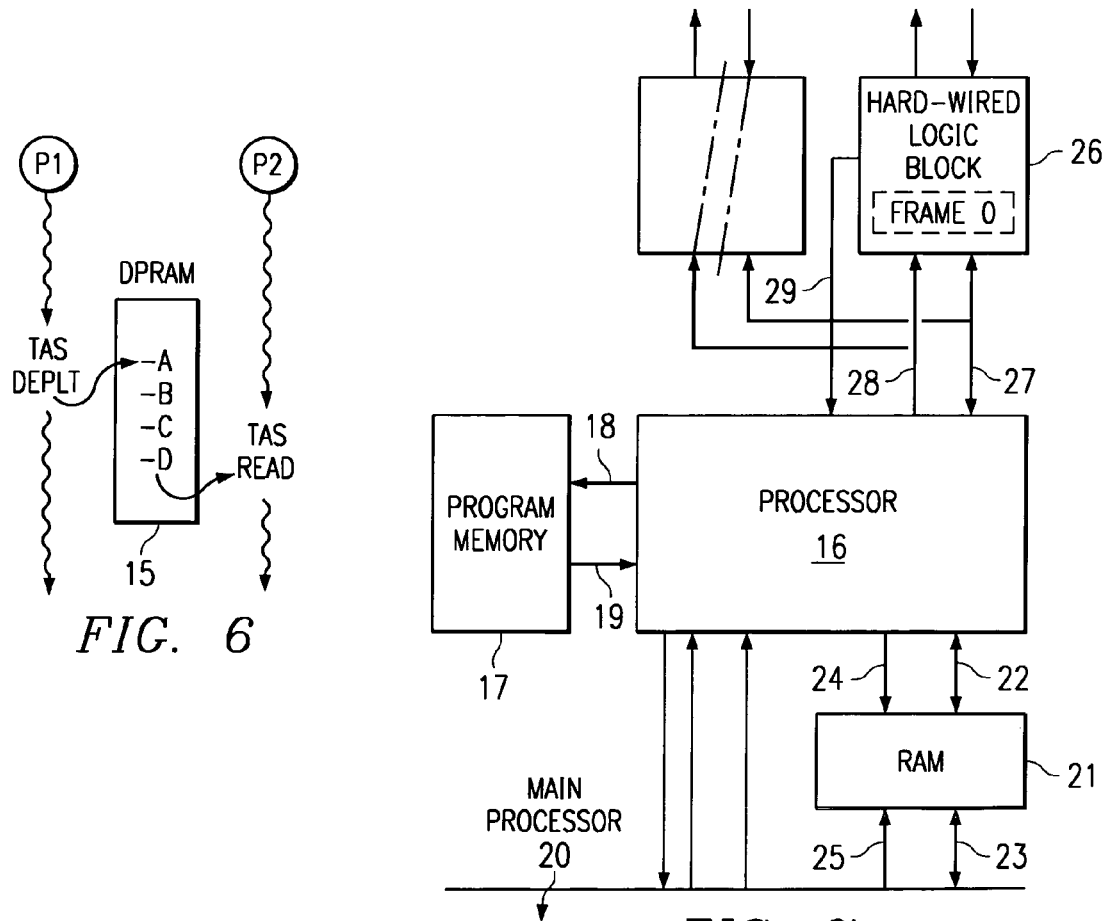
FIG. 6
FIG. 7

| ALU |
|---|
| 0 - SUB |
| 1 - CPL |
| 2 - ADD |
| 3 - AND |
| 4 - OR |
| 5 - XOR |
| 6 - PASSA |
| 7 - SUBC |

| CODE |
|---|
| 0 - ST TYPE 1 |
| 1 - ST TYPE 2 |
| 2 - B TYPE 3 |
| 3 - B TYPE 4 |
| 4 - CALL |
| 5 - RTS |
| 6 - RTI |
| 7 - STOP |

| Cc | |
|---|---|
| 0 - NEVER | 8 - Z12 |
| 1 - ALWAYS | 9 - LO |
| 2 - Z | 10 - LE |
| 3 - NZ | 11 - G |
| 4 - ZD | 12 - GE |
| 5 - C | 13 - NU |
| 6 - NC | 14 - (BL) |
| 7 - USER | 15 - |

| Rm/Rn |
|---|
| 0 - P0 |
| 1 - P1 |
| 2 - A |
| 3 - B |
| 4 - X |
| 5 - PC |
| 6 - SW |
| 7 - SP |

| W |
|---|
| 0 - R/W BYTE |
| 1 - R/W WORD |

| L |
|---|
| 0 - Rm LOW |
| 1 - Rm HIGH |

| L |
|---|
| 0 - DMA/Rn LOW |
| 1 - DMA/Rn HIGH |

| S |
|---|
| 0 - PASS |
| 1 - SRA |
| 2 - SLL |
| 3 - SRL |

FIG. 13
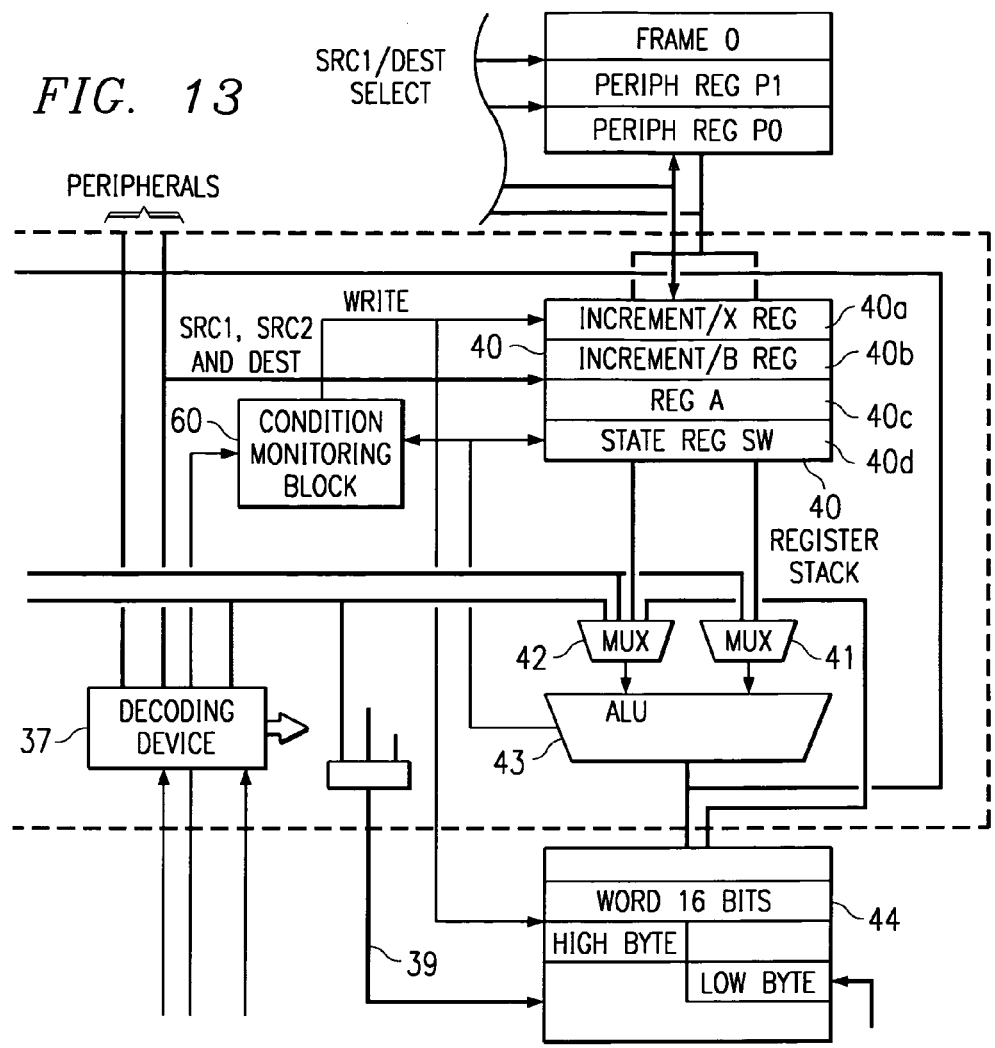
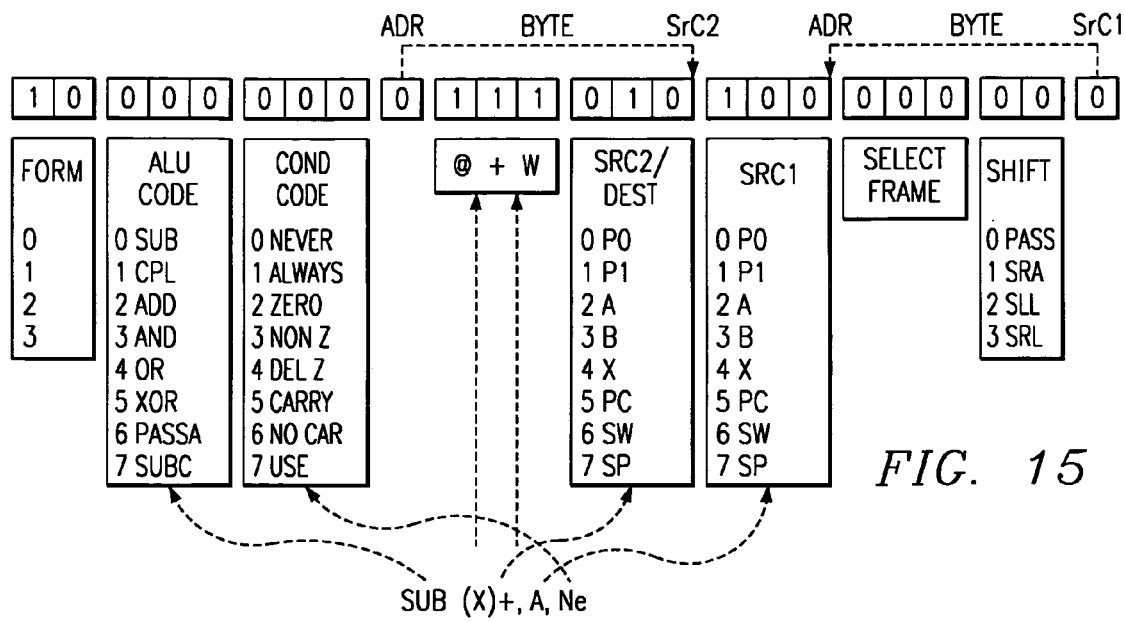
FIG. 15

MULTIPLE PROCESSOR CELLULAR RADIO

This is a division of application Ser. No. 08/890,894, filed Jul. 10, 1997, now U.S. Pat. No. 7,028,145, which is a continuation of application Ser. No. 07/902,191 filed Jun. 22, 1992, now U.S. Pat. No. 5,740,458 claims priority of application Ser. No. 9107985 filed on Jun. 27, 1991 in Protocol Processor Intended for the Execution of a Collection of Instructions in a Reduced Number of operations, under 35 U.S.C. 119.

The present invention relates to processors and more particularly concerns protocol processors.

The tendency to denser and denser integration of computer hardware leads to the requirement to have greater and greater computational power available for this hardware.

In every application, there are differing information processing needs.

Two classes of processing are distinguished:

scalar processing not calling upon a dedicated digital signal processor (DSP) and vector processing calling upon a DSP.

Scalar processing encompasses a high-level task which is the monitoring of the application or the management of functioning and tasks which are generally carried out by hard-wired logic or a processor and which may be identified as protocol processing.

Vector processing includes signal processing tasks generally carried out by a DSP and matrix computation which requires a more powerful structure than that of the DSP and which is generally of the "array processor" type.

Currently, in low-cost applications, it is sought to reduce the number of processors to the minimum, so much so that, depending on the type of application, the main processor which monitors the progress of an algorithm will be either a microprocessor, or a DSP. If a protocol processing is needed in this application, it is endeavoured to process this protocol in the processor or in the dedicated digital signal processor DSP.

Since protocol processing is highly oriented towards bit manipulation and interrupts, it will not be very costly if it is carried out by the microprocessor. By contrast, if a DSP is used, the structure of the processor and the instruction set will be poorly suited and will result in a loss of efficiency in the sense that more instructions will be required and utilization of the available silicon will be poor.

The same remark may be made as regards matrix processing which can be performed by a DSP since it contains a hard-wired multiplier. However, a microprocessor is very poorly suited to performing such a matrix processing.

The invention therefore aims to create a special processor architecture oriented towards protocol processing and having a very simple structure which is not costly in numbers of transistors, yet makes it possible to unburden the main processor of a system, of simple tasks which are poorly suited to its complexity.

The subject is therefore a protocol processor intended to be associated with at least one main processor of a system with a view to the execution of tasks to which the main processor is not suited, characterised in that it comprises a program part including an incrementation register, a program memory connected to the incrementation register in order to receive addresses thereof, a decoding part intended to receive instructions from the program memory of the program part with a view to executing the said instruction in two cycles, and a data part for executing the instruction.

The invention will be better understood with the aid of the description which will follow, given merely by way of example and made with reference to the attached drawings, in which:

FIG. 3 is a table indicating the performance of a channel encoding/decoding routine;

FIG. 4 is a table representing performance routines for a modem;

FIG. 5 is a diagram of a data processor system including a main processor and a protocol processor with a communication memory being interconnected between the main processor and the structure of the protocol processor according to the invention;

FIG. 6 represents the writing by a program P1 of parameters for a program P2 in a memory of the system;

FIG. 7 is a general overall diagram of a protocol processor according to the invention;

FIG. 13 represents the manner in which the condition monitoring block is connected up in the protocol processor according to the invention;

FIG. 15 is a table representing an exemplary instruction code for the protocol processor according to the invention;

As already indicated in the preamble of the present description, in every application there exist different information processing needs, among which can be distinguished scalar processing and vector processing.

Figure 1:
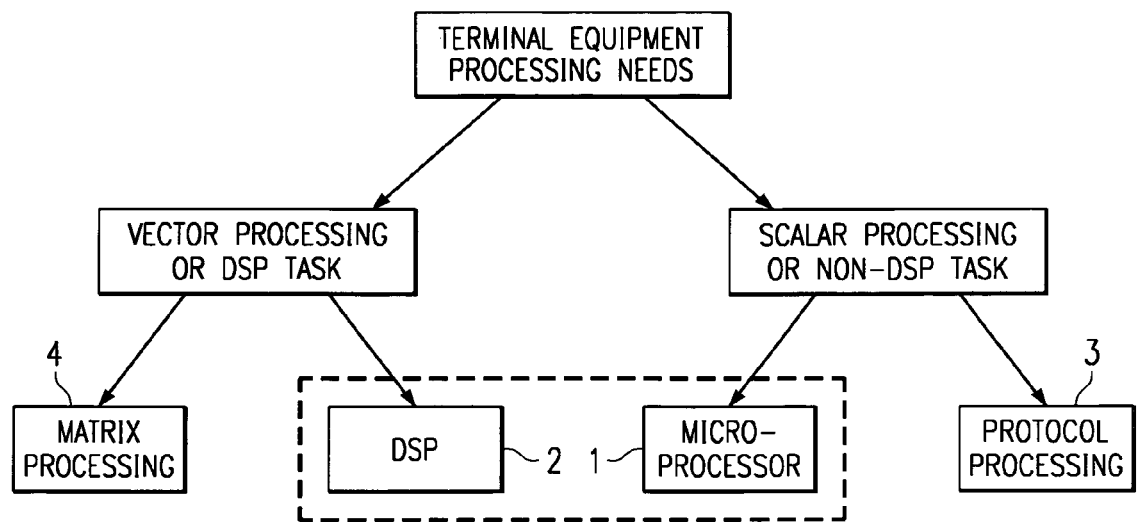
FIG. 1 is a diagram of the distribution of tasks in an information processing system implementing the use of several processors.

As represented in FIG. 1, in low-cost applications it is endeavoured to minimise the number of processors, so much so that depending on the type of application, an information processing system comprises a main processor which monitors the progress of the algorithm and consists of either a microprocessor 1, or a DSP 2. In such an application, there is a need for a protocol processing 3 which it is sought to process in the processor 1 or in the DSP 2.

As indicated above, the processing of the protocol is not very costly if it is carried out by the microprocessor 1, but if the DSP 2 is used, the structure of such a processor and the instruction set will be poorly suited and will result in a loss of efficiency due to the requirement of a more sizeable number of instructions and to a poor utilization of silicon.

The same remark may be made as regards matrix processing 4 which can be performed by a DSP 2 since it contains a hard-wired multiplier, but in respect of the execution of which a microprocessor is poorly suited.

Figure 2:
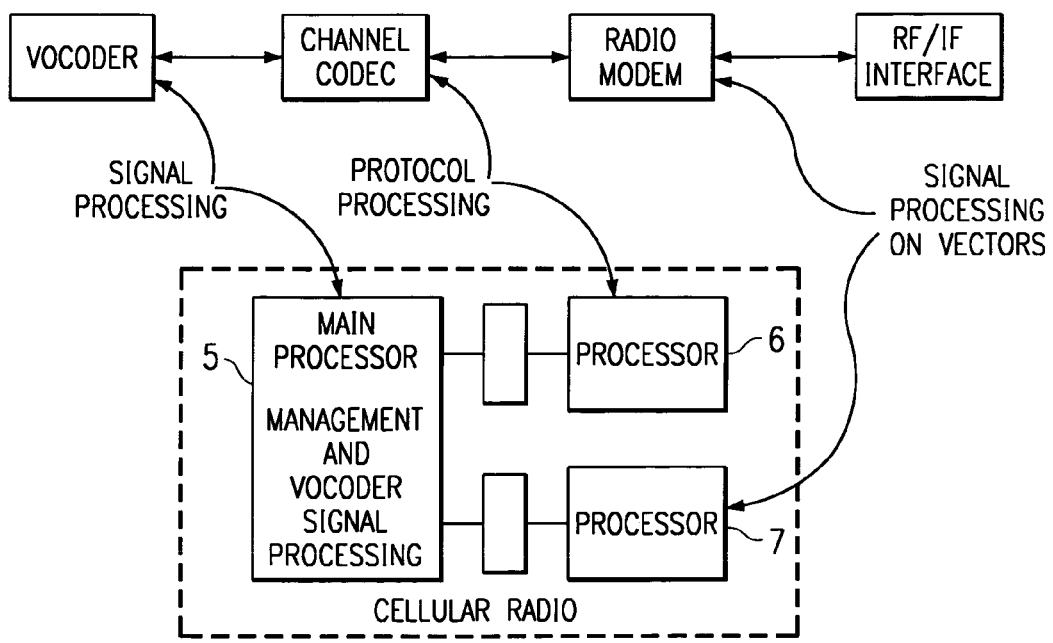
FIG. 2 is a diagram of an application of a protocol processor to a collection of cellular radios.

FIG. 2 shows a cellular-radio application in which a main processor 5 comprises a dedicated digital signal processor DSP. It effects both the management of the relevant application and the vocoder part. The protocol processing part is carried out by a dedicated processor 6 adapted to bit processing. The modem part of the system which requires large computational power oriented towards vector processing is embodied in a dedicated processor 7 of the array processor type.

In this case, there is a significant processing need in regard to vectors, with three- to eight-bit accuracy and the core of a DSP generally working on 32 bits is very poorly suited to such a task. Moreover, the silicon integrated circuits of such a system are very poorly utilized.

Another advantage of sharing an application among several processors having differing characteristics, is that each processor works on its own task in parallel with the others. If, in the example of FIG. 2, the three processors 5, 6 and 7 operate at the same clock frequency, the overall power of the circuit is tripled. The factor of efficiency of the instruction set which is adapted to the relevant task must also be added to these advantages.

For two conventional routines for protocol processing, computation of the CRC and identification, the efficiency of the processor 6 in relation to a DSP of the TMS 320 C50 type is 2.2, whereas the ratio in terms of number of transistors for producing two processors is 0.11. The table of FIG. 3 shows the performance of the channel encoding/decoding routines. The second column from the left indicates the routine required for employing a DSP, whereas the third column shows elements of a routine entailing the use of a protocol processor.

It follows from the foregoing that the MIPS/XTOR performance ratio is 19.6 in favor of the protocol processor 6.

In the case of an array processor, such as the processor 7 of the system of FIG. 2, whose performance in respect of modem routines is represented in the table of FIG. 4, it is also shown that for a modem routine, there is also a significant efficiency ratio between the DSP 5 and the processor 7, the gain being 10 in terms of MIPS.

Several processors operating in parallel on different tasks make it possible to increase the processing power. The application is shared among the various processors which must exchange information.

The means of exchange generally comprises a serial link or a communication memory. In FIG. 5 such a communication memory has been represented. In this figure are seen the DSP 5 and the processor 6 of the device of FIG. 2. The core 8 of the DSP 5 is connected to the core 9 of the processor 6 by a synchronizing circuit 10. The DSP 5 further includes a program ROM memory 11 and a local RAM memory 12. The protocol processor 6 includes also, a program ROM memory 13 and a local RAM memory 14. The local RAM memories 12 and 14 of the DSP 5 and of the processor 6 are connected by a common DPRAM memory 15 with dual port. The synchronizing of the processes P1 and P2 is performed by a test and set instruction TAS which, as indicated in FIG. 6, makes it possible to ensure that a single processor utilizes the memory 15 (or memory zone) at any moment.

There also exist other process synchronizing mechanisms. For example, with the TAS instruction of FIG. 6, the program P1 writes parameters for the program P2 to the DPRAM memory 15.

Since the parameters are related, if P2 accesses the memory 15 during modification by P1, there is a risk of error.

The program P1 tests, with the TAS instruction, whether the memory 15 is available and generates an occupied signal. During modification of the parameters a,b,c and d which are in the memory 15, if the program P2 requests access to this memory zone, its TAS instruction returns an occupied signal to it. The program P1 frees the memory 15 at the end of access and the program P2 can then access the memory if it makes a new request.

As FIG. 5 shows, each processor has its own ROM program memory 11, 13 respectively, a local work memory 12, 14 and a processor core 8, 9. The synchronizing means 10 and the DPRAM 15 are common to both processors.

In FIG. 7 has been represented the overall diagram of a protocol processor.

The processor includes a processor proper 16 connected to a program memory 17 by an address bus 18 and an instruction bus 19. It is connected at data-stream level to a main processor 20 across a communication RAM memory 21 connected to each of the processors by a data bus 22, 23 and corresponding address bus 24, 25.

The processor 16 can also be connected by data buses and selection and address buses 27, 28 to a hardwired logic block 26 permitting the shaping of signals for a particular processing which it would be too costly to carry out by means of the protocol processor 16. The logic block 26 is moreover connected to the processor 16 by an interrupt line 29.

Figure 8:
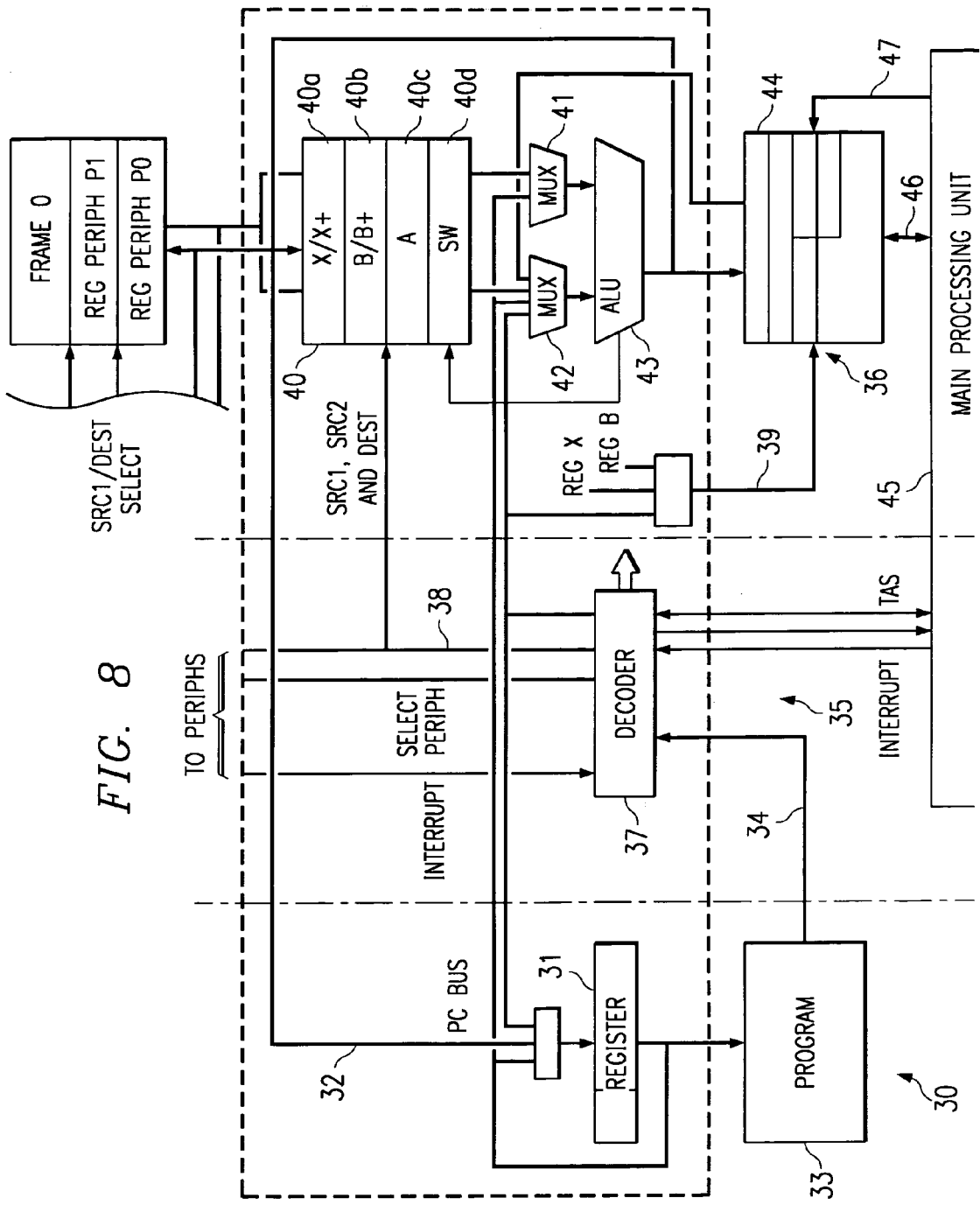
FIG. 8 is a more detailed overall diagram of the protocol processor of FIG. 7.

FIG. 8 shows in more detail the protocol processor according to the invention.

This processor in fact comprises three parts.

A program part denoted with the general reference numeral 30 contains an incrementation register 31 which is incremented with each cycle except when an immediate value PMA is loaded by way of a bus 32. The register 31 generates the address of a memory in the shape of a program 33 which itself generates an instruction on a bus 34. The processor further comprises a decoder part denoted by the general reference numeral 35 which receives the code of the instruction from the program ROM memory 33. This instruction is executed in two cycles in pipeline mode as the diagram of FIG. 9 shows.

Figures 9, 11:
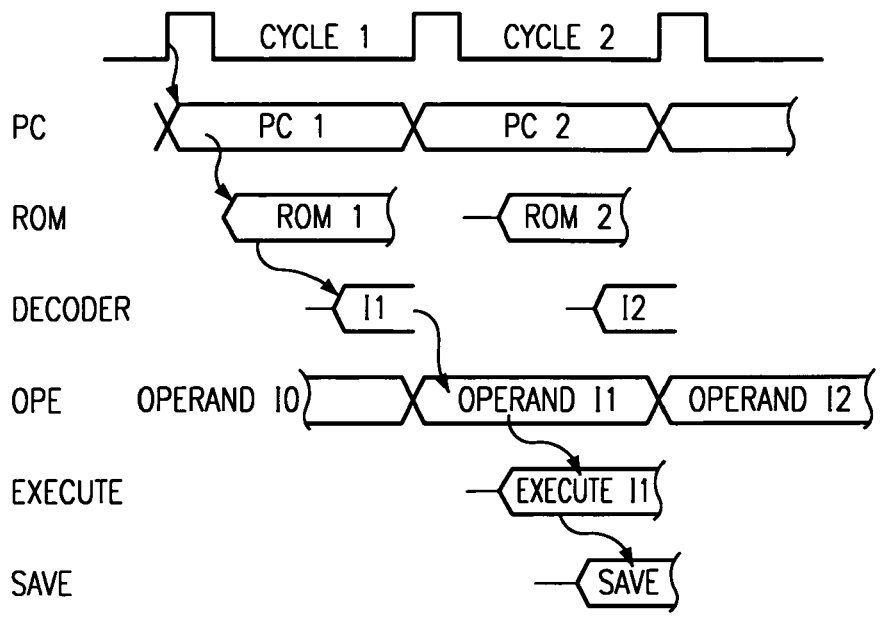
FIG. 9 is a chart representing signals at diverse points of the protocol processor of FIG. 8.
FIG. 11 is a representation of the assigning of instruction bits.

During cycle 1 indicated in FIG. 9, the program memory 33 is read at the address PC1 of the incrementation register 31. At the end of the cycle, the instruction I1 delivered by the program memory 33 is decoded. During cycle 2, the operators of the instruction are read at the addresses specified by the code and the data part 36 which supplements the processor and which will subsequently be described executes the instruction. The result is stored at the address specified by the code of the instruction at the end of cycle 2.

During cycle 2, the decoder 37 of the decoding part executes the same process on the instruction I2 situated at the address PC2 of the register 31.

With each cycle the decoder generates, on the bus 38, the address of the register used in the instruction and/or a RAM memory address on the bus 39. The decoder 37 which also plays the role of monitoring device receives from both sides interrupt signals and test and set signals TAS which are intended for synchronization. The data part 36 of the processor comprises a bank of registers 40 connected to two multiplexers MUX A and MUX. B 41 and 42, intended for selecting the various registers or the RAM memories at the input of an arithmetic and logic and shift unit 43. The operation defined in the field of the instruction is executed between the two values at the inputs A and B of the arithmetic and logic and shift unit 43 and the result is carried within the same cycle to the destination address.

This destination address is embodied in the diagram of FIG. 8 by a dual-port memory 44 which is common to the protocol processor and to the main processing unit CPU 45 with which it is associated. The memory 44 is connected to the CPU 45 by means of data and address buses 46, 47.

Figure 10:
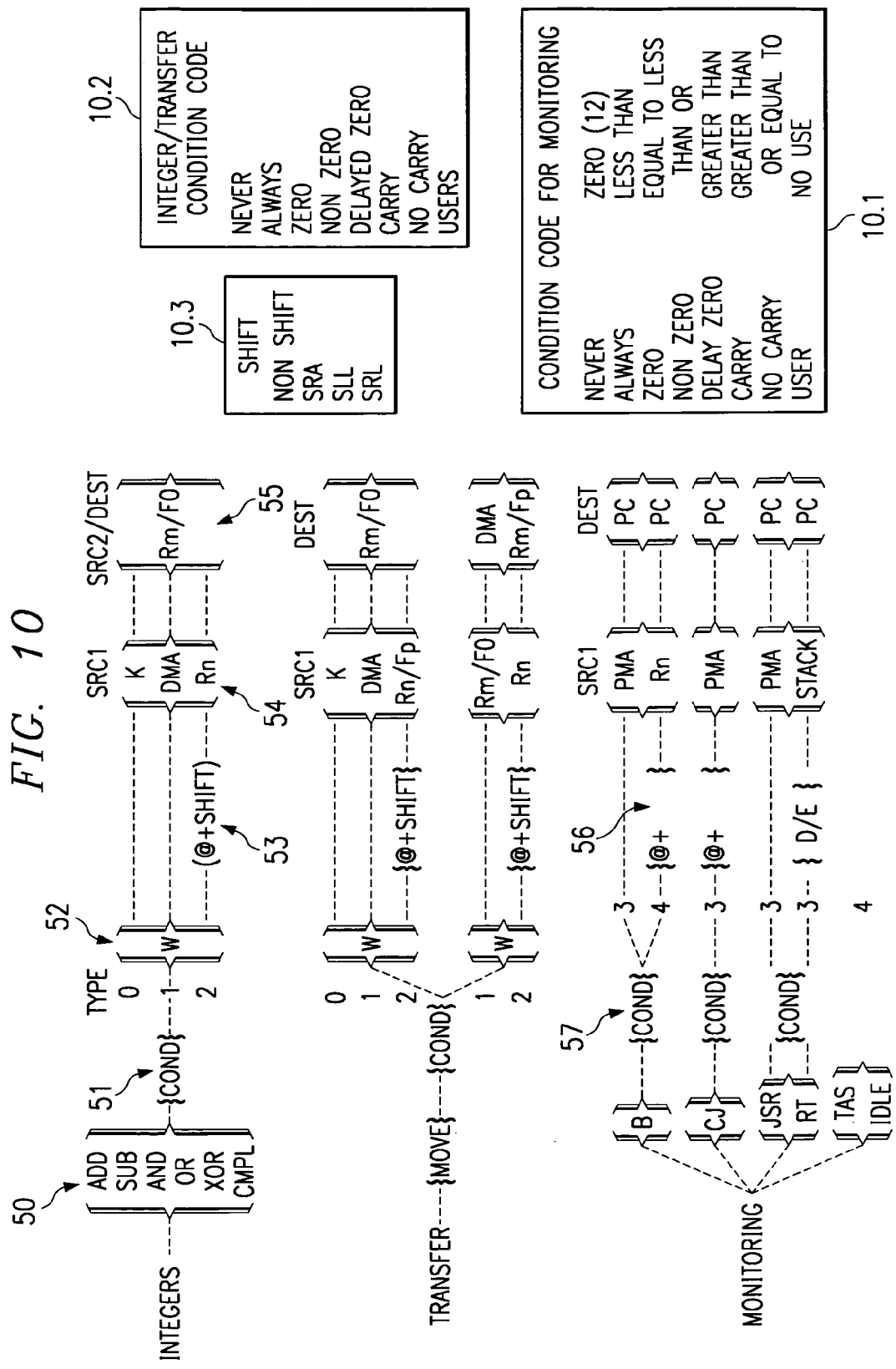
FIG. 10 represents an instruction set for the protocol processor according to the invention.

In FIG. 10 has been represented an instruction set intended for the protocol processors according to the invention.

It includes three classes of instructions:
Integers: arithmetic and logic operations on integer numbers.
Transfer: between register and register/memory.
Monitoring: all the operations modifying the value of the incrementation register or PC 31 (FIG. 8).

The fields, represented in FIG. 10, of the instruction of the protocol processor will now be described. A 5-bit field reserved for the code of the instruction is denoted by 50. It defines the operation executed between the Src1–2 operators.

51 denotes a condition field which defines the conditions under which this instruction is executed. The corresponding conditions are defined in tables 10-1 and 10-2 of FIG. 10. This part will subsequently be described in detail.

52 defines an instruction W establishing whether the operation is executed between 16-bit words or bytes.

53 indicates a field @+ shift in which @ indicates that the registers X or B contain the address of access to the common DPRAM memory 44 of FIG. 8.

+ denotes the registers X or B incremented by access to the memory.

Shift denotes the result of the shifted operation in table 10-3 of FIG. 10 prior to writing to the destination register.

54 denotes the SRC1 instructions in which:
K: constant
DMA: value contained in the DPRAM 44 at the address DMA
Rn: register 55 SRC2/DEST Rm: source and destination register in the case of the operations on "Integers" and destination register in the other cases.

The assigning of the bits of the instruction is defined according to five types as represented in FIG. 11.

Figures 12, 14:
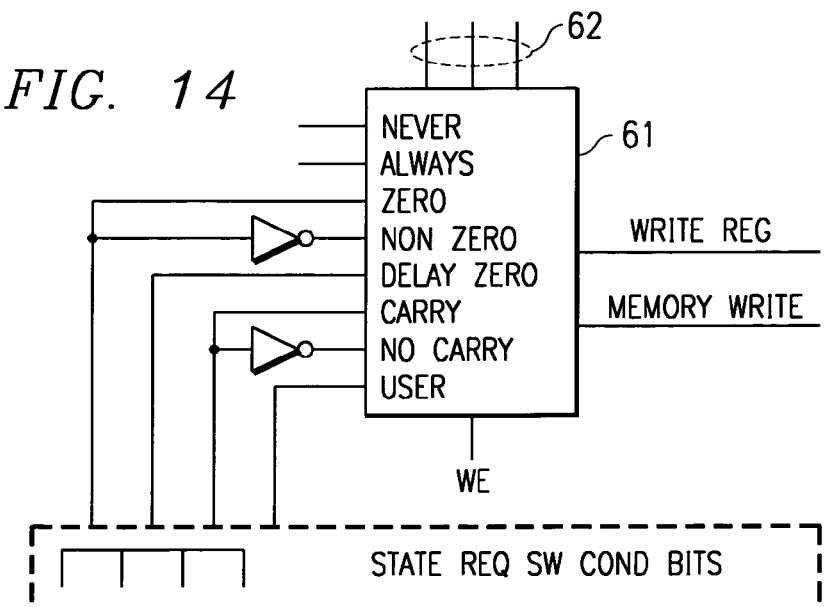
FIG. 12 represents in detail the various fields.
FIG. 14 is a partial diagram of the means of generating a write pulse.

The various fields are defined in detail in FIG. 12.

As shown by the instruction set of FIG. 10, certain instructions much used in bit manipulation are not available directly.

It will be seen that the instructions such as:

| CMP  | Compare          |
| BITC | Bit test         |
| BSET | Bit setting      |
| CSIF | Compare and jump | are constructed by adjoining the condition field Cc represented in FIG. 12 to that of the code or of the operation performed in the arithmetic and logic unit.

FIG. 13 shows the way in which a condition monitoring block 60 is connected up in the protocol processor according to the invention between the monitoring and decoding device 37 and the stack of registers 40.

This condition monitoring block receives on the one hand the information from the state register SW 40d from the register stack 40 and from the condition field of the instruction.

As FIG. 14 shows in greater detail, the "REG WRITE" or "MEMORY WRITE" signals generate a write pulse if the input of a multiplexer 61 selected by the condition code present on its inputs 62 is at the high level. In this case the result of the operation performed by the arithmetic and logic unit 43 is written to the destination operator.

In the contrary case there is no modification of the destination.

The state register SW 40d is assigned by the result of the operation in progress.

FIG. 15 shows an illustrative instruction code. The user code is: CMP (X)+, A. The content of the register A 40c is compounded with the content of the memory address defined by the register X 40a. The result assigns the following state bits:
C=1 if A≧(X)
Z=1 if A=(X)
N sign of the result Following access, the address contained in X is incremented.

In reality, by selecting the condition code 0=Never with the ALU code SUB (subtract), the result is achieved since the comparison is a subtraction without modification of the destination. Another example is Tag Sub, A, U If the user bit U has been set to 1, the result of the subtraction: A-Tag is placed in A, and the state is modified. If U=0, the result is not saved.

Figure 16:
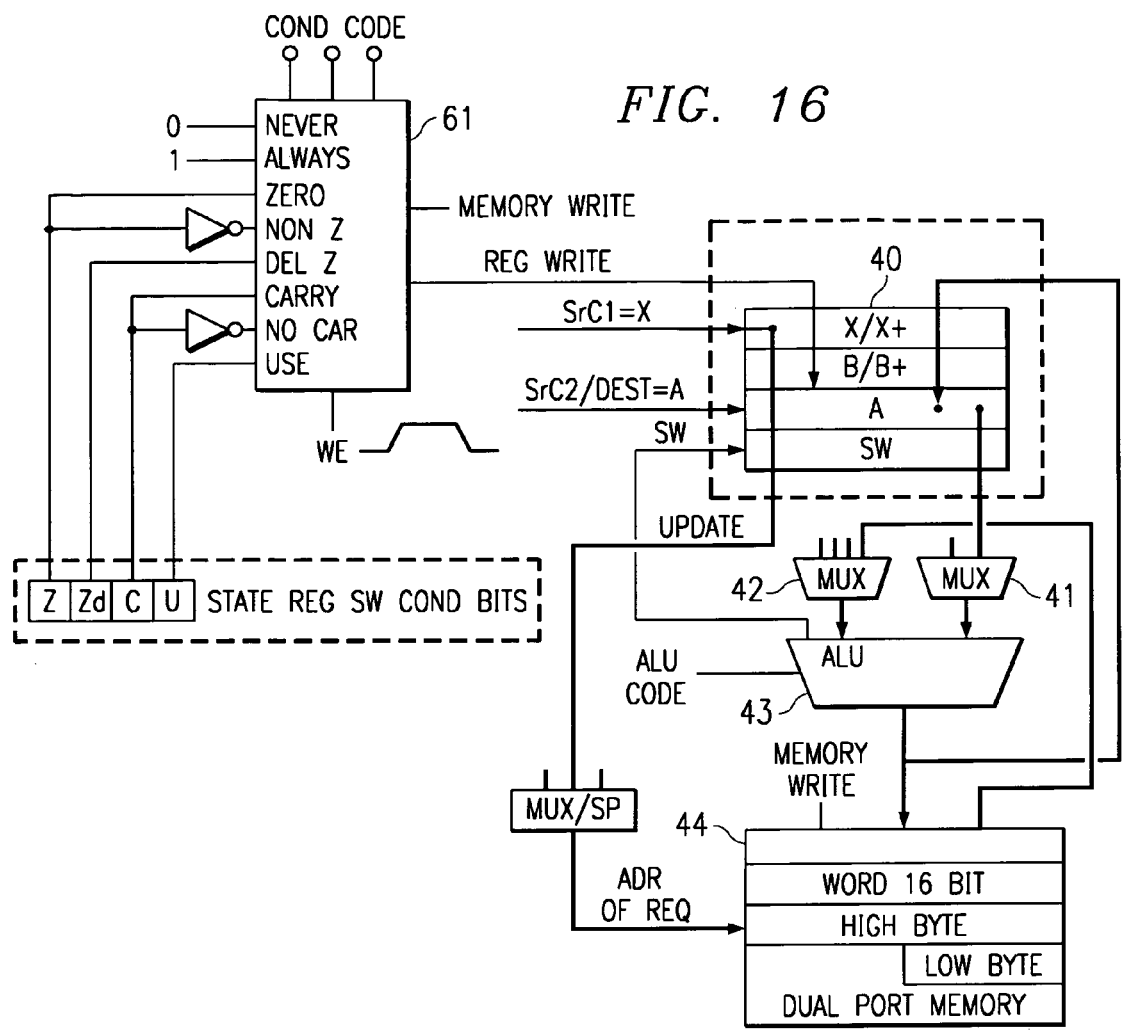
FIG. 16 is a diagram of an example showing the advantage of a structure according to the invention in relation to a conventional DSP TMS320 C25 in the generation of a CRC code.

In FIG. 16 has been represented in a partial view the multiplexer 61 connected up to the register stack 40 of the protocol processor represented in FIG. 13. It is seen in this figure that CMP (X)+, A is equivalent to SUB (X)+, A, Never. The Never condition code selects the input of the multiplexer 61 which is at the "0" level and the pulse WE remains of no effect on the REG. WRITE signal which transfers the result from the arithmetic and logic unit 43 into the register A 40c.

The example above shows the advantage of such a structure in relation to a DSP ThS320 C25 in the generating of a CRC code.

|      | Code C25 |         | Number of cycles |
| ---- | -------- | ------- | ---------------- |
|      | LAC      | R, 15   | 1                |
|      | XOR      | CRC     | 1                |
|      | ET       | M.8000  | 1                |
|      | Bz       | BCR1    | 2                |
|      | LAC      | POLYGEN | 1                |
|      | XOR      | CRC     | 1                |
|      | SACL     | CRC     | 1                |
| BCR1 | LAC      | CRC, 1  | 1                |
|      | SACL     | CRC     | 1                |
|      |          |         | 10               |

| Code PP. | | Number of cycles |
| --- | --- | --- |
| 1) | AND K, A, Never | 1 |
| 2) | AND 8000, B, Never | 1 |
| 3) | XOR POLYGEN, B, Zd | 1 |
| 4) | SLL B | 1 |
| | | 4 |

Figure 17:
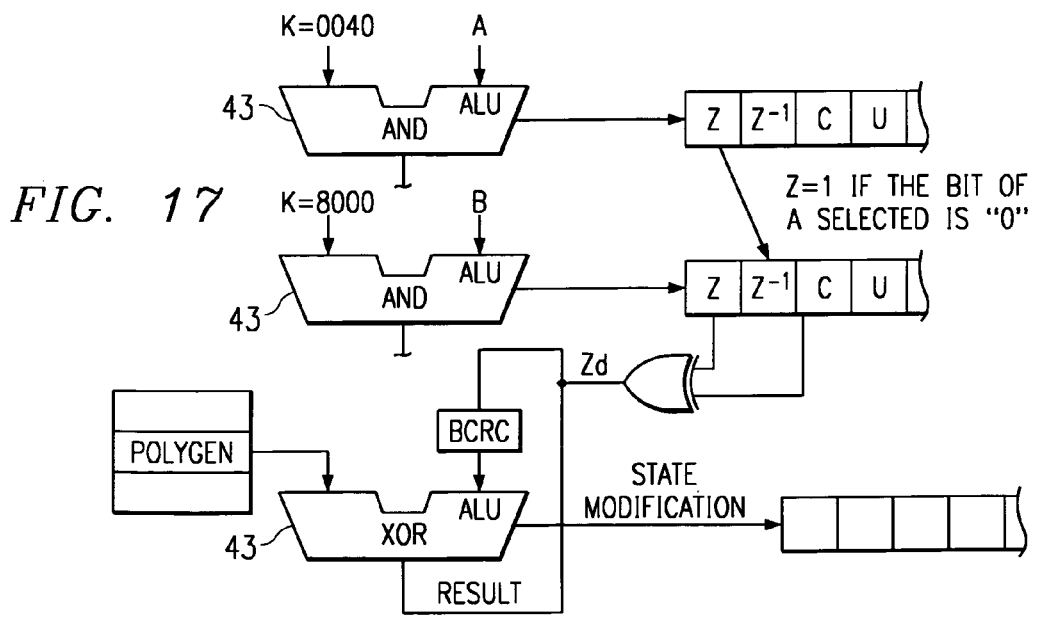
FIG. 17 shows an operating diagram for the arithmetic and logic unit of the protocol processor according to the invention.

The four operations obtained with the aid of the protocol processor according to the invention are detailed with reference to FIG. 17.

Operation 1

This is an AND operation for the 0040 bit with the register A 40c (FIG. 13). The result is not written to the register A. Bits Z, C, Zd are set in the manner indicated to the right of the arithmetic and logic unit 43 (FIG. 17).

Operation 2

This is an AND logic function for the 8000, B, Ne code.

The CRC code is located in the register B 40b, the most significant bit MSB, that is to say the bit 8000 is tested.

Z=1 if the most significant bit of the register B is zero.

Z from the preceding cycle is transmitted to $Z^{-1}$.

Operation 3

XOR POLYGEN, B. Zd.

The logic operation XOR between the generating polynomical and the CRC code is next carried out in the arithmetic and logic unit 43. The result is written to the register B 40b if the bit Zd is equal to 1, Zd being defined by the condition $Z \oplus Z^{-1}$.

Operation 4: SLL B

The register B 40b (CRC code) is shifted one position to the left.

The architecture of the processor oriented towards the processing of the protocol which has just been described is a very simple structure which is not very costly in terms of number of transistors. It makes it possible to unburden the main processor of simple tasks which are poorly suited to its complexity.

Since the protocol processor and the main processor operate in parallel, means of synchronizing tasks are provided.

The instruction set is limited in the present example to 15 so as to simplify the structure. The instructions are divided into three groups "Integer, Transfer, and Monitoring". In each of these instructions, a conditional field makes it possible to select a condition for saving the result in the destination register.

The conditions use the bits of the state register which have been modified by the results from the preceding instruction or instructions.

A bit for validating modification of the state makes possible easy functioning in a protected mode.

The invention claimed is:

1. A cellular radio, comprising:
   a first processor, said first processor being the main processor of the cellular radio;
   a second processor coupled to said first processor, said second processor performing protocol processing; and
   a third processor coupled to said first processor, said third processor performing signal processing on vectors.

2. The cellular radio of claim 1, wherein said first processor performs management and vocoder signal processing.

3. The cellular radio of claim 1, wherein said second processor is a dedicated processor adapted to bit processing.

4. The cellular radio of claim 1, wherein said third processor is a dedicated processor of the array processor type.

5. The cellular radio of claim 1, wherein said first, second and third processors operate in parallel.

6. The cellular radio of claim 1, wherein said first processor is a digital signal processor (DSP).

7. A cellular radio, comprising:
   a first processor for performing management and vocoder signal processing;
   a second processor coupled to said first processor, said second processor performing protocol processing; and
   a third processor coupled to said first processor, said third processor performing signal processing on vectors.

8. The cellular radio of claim 7, wherein said first processor is a digital signal processor (DSP).

9. The cellular radio of claim 7, wherein said second processor is a dedicated processor adapted to bit processing.

10. The cellular radio of claim 7, wherein said third processor is a dedicated processor of the array type.

11. A cellular radio, comprising:
    a first processor for performing management and vocoder signal processing;
    a second processor coupled to said first processor, said second processor performing protocol processing; and
    a third processor coupled to said first processor, said third processor being a dedicated processor of the array type.

12. The cellular radio of claim 11, wherein said first processor is a digital signal processor (DSP).

13. The cellular radio of claim 11, wherein said second processor is a dedicated processor adapted to bit processing.

* * * * *